United States Patent [19]

Bandyopadhyay et al.

[11] Patent Number: 4,845,763
[45] Date of Patent: Jul. 4, 1989

[54] TOOL WEAR MEASUREMENT BY MACHINE VISION

[75] Inventors: Pulak Bandyopadhyay, Rochester Hills; Dwight A. Blaser, Fraser; Brian D. Kaminski; Yong H. Lee, both of Troy, all of Mich.

[73] Assignee: General Motors Corporation, Detroit, Mich.

[21] Appl. No.: 118,277

[22] Filed: Nov. 6, 1987

[51] Int. Cl.$^4$ .......................... H04N 7/18; G06K 9/00
[52] U.S. Cl. ........................................ 382/8; 358/101; 358/106
[58] Field of Search .............. 382/8, 394, 1; 358/101, 358/106; 73/104; 356/237

[56] References Cited

U.S. PATENT DOCUMENTS 4,493,554  1/1985  Pryor et aql. .................... 356/394
4,700,224 10/1987  Miyasaka et al. ................. 358/106

OTHER PUBLICATIONS

Sata et al.; "Identification of Machine and Machining States by use of Pattern Recognition Technique", 16th CIRP International Seminar of Manufacturing Systems, 1984.

Maali et al.; "A Vision Based Technique for Automatic Tool Set-Up, Identification and Wear Measurement in CNC Lathe".

Primary Examiner—Leo H. Boudreau
Assistant Examiner—Yonnie Jung
Attorney, Agent, or Firm—Patrick M. Griffin

[57] ABSTRACT

The disclosure reveals a computer vision technique to measure flank and crater wear of a single point cutting tool. This direct tool wear measurement method uses a microscope mounted camera to acquire an image of the tool. Special lighting of a face of the tool shows contrast of the wear region in the image. The image analysis is based on an interactive procedure utilizing a general purpose image processing system. A computer program calculates ten parameters to characterize flank and crater wear.

2 Claims, 3 Drawing Sheets

TOOL WEAR MEASUREMENT BY MACHINE VISION

FIELD OF THE INVENTION

This invention relates to tool wear measurement and particularly to such measurement using machine vision techniques.

BACKGROUND OF THE INVENTION

Tool wear has been extensively studied by the machine tool industry and academia for over 50 years. In general, research has focused on correlating tool wear with machining signals, mainly cutting forces, tool vibration, and cutting temperature, to provide the necessary process information needed for the development of intelligent unmanned machining systems. Although these machining signals can be easily measured, an accurate and reliable method of measuring cutting tool wear has not been developed and thus the accurate correlation of machining signals to tool wear has not been possible.

During machining, the failure of a cutting tool is caused by wear due to the interactions between the tool and the workpiece (flank wear and between the tool and the chip (crater wear). Guidelines and specifications for flank and crater wear measurement are available in machining handbooks. Traditionally, these small wear parameters are measured under laboratory conditions, using a toolmaker's microscope. However, these measurements provide a limited definition of the wear of a cutting edge. Tool wear is not simple in nature and because of the irregular boundaries and the varying surface textures, the flank and crater wear boundaries are difficult to define. As a result, measurements of the width or length of flank and crater wear contours are only approximations and are not repeatable because of measurement error. Moreover, it has been recognized by those skilled in the art that the area of a wear region is a more relevant parameter for quantifying tool wear, but there has been no practical, accurate method for measuring the irregular wear areas. For these reasons, a computer vision technique to measure tool wear was developed.

SUMMARY OF THE INVENTION

It is therefore an object of the invention to provide a method of accurately measuring tool wear. It is a further object to provide such a method capable of quantifying tool wear on the basis of wear area. Still another object of the invention is to provide such a method that is applicable to a variety of tool shapes, has an absolute wear measurement reference, and has a high measurement resolution.

The method of the invention is carried out by the steps of; illuminating a cutting tool face by directing light toward the face at an angle which shows contrast between worn and unworn surface regions, acquiring and storing a digitally encoded image of the cutting tool face, segmenting wear regions of the image on the basis of the contrast, and measuring the dimensions of the segmented wear regions.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figure 1:
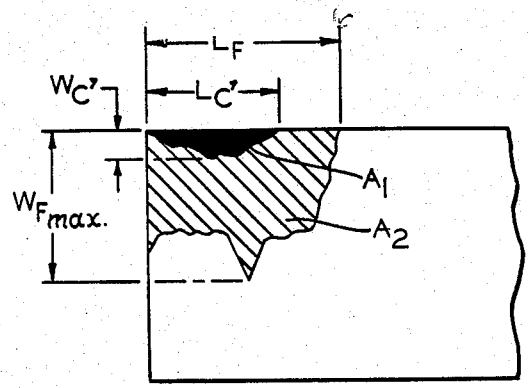
FIG. 1 is a flank face view of a portion of a cutting tool showing a typical wear pattern and the dimensions for quantifying the wear.

The two most common wear mechanisms, namely flank and crater wear, are considered in this specification. Flank wear is illustrated in FIG. 1 which shows the side view or flank face of a single point cutting tool of a kind commonly used in turning operations. The total wear $A_F$ visible on the flank face is made up of a minor chipped area $A_1$ which is not always evident in a given tool, and a major wear region $A_2$ caused by rubbing against the part being machined. The width and length of the wear regions are also useful parameters. Thus the following parameters are to be measured to define flank wear.

1. Total flank wear area, $A_F = A_1 + A_2$, where $A_2$ is the chipped area.
2. Average wear land width, $W_{avF} = A_F/L_F$ where $L_F$ is the contact length between the tool and workpiece.
3. Maximum wear land width, $W_{Fmax}$.
4. Length ($L_C$) and width ($W_C$) if the cutting edge is chipped and crater wear is visible.

Figure 2:
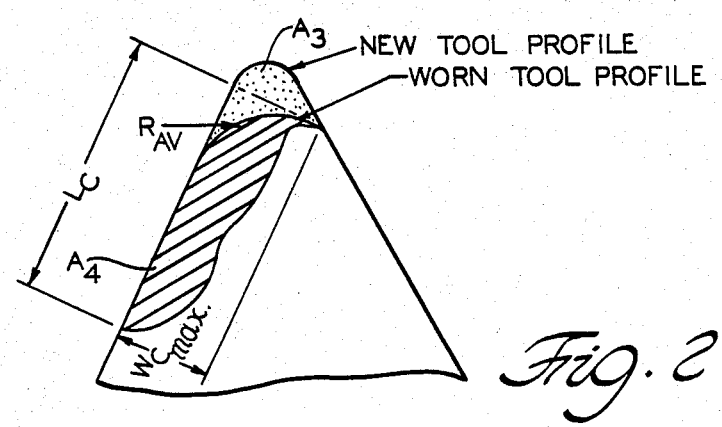
FIG. 2 is a rake face view of a portion of a cutting tool showing a typical wear pattern and the dimensions for quantifying the wear.

During machining, chips removed from the part rub against the top of the tool to wear a depression or crater in that face. Crater wear is shown in FIG. 2 which is the top view or the rake face. The rounded nose of a new tool becomes worn off to assume a worn tool profile having a larger radius nose than the new tool. The area $A_3$ shown in the FIG. 2 is thus no longer present but must be measured nonetheless. The following parameters need to be measured to define crater wear:

1. Wear areas $A_3$ and $A_4$, where $A_3$ is the area eroded during cutting, and $A_4$ is the crater area still visible.
2. Average width of the crater wear, $W_{avC} = A_4/L_C$, where $L_C$ is the contact length.
3. Maximum width of crater, $W_{Cmax}$.
4. Average nose radius of a worn tool $R_{av}$.

Figure 3:
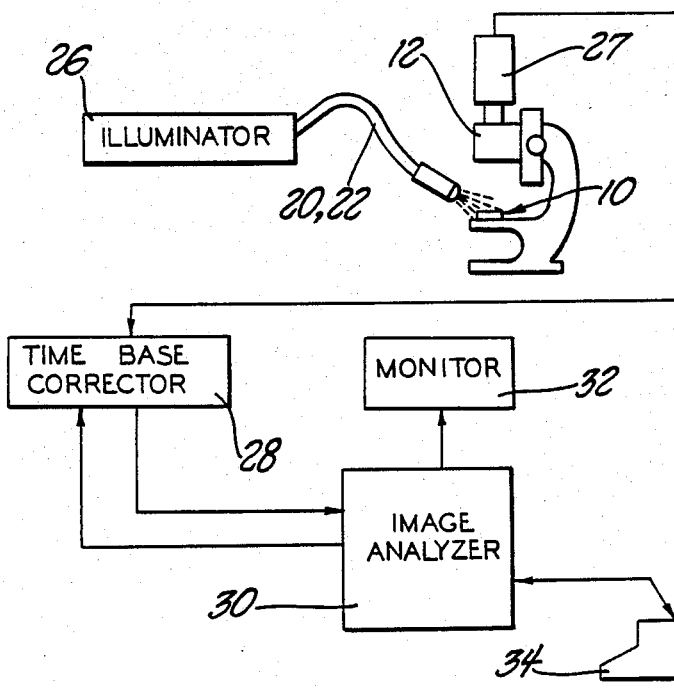
FIG. 3 is a schematic diagram of a tool wear measurement for carrying out the method of the invention.
Figure 4:
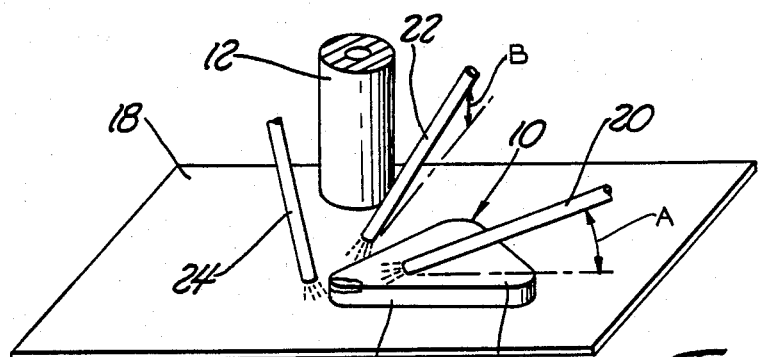
FIG. 4 is perspective view of a tool measurement setup for carrying out the method of the invention.

The block diagram of the tool wear measurement system is shown in FIG. 3. A cutting tool 10 is positioned under a microscope 12 using a tool holding fixture, not shown. The fixture locates the tool accurately in the image plane of the microscope 12 for observation of either the flank or rake surface. Noncoherent light is used for illumination. Lighting is controlled using fiber optic guides to achieve the best contrast between the wear areas, the base material and the background. FIG. 4 best illustrates the lighting system. The tool 10 is shown with the rake surface 14 facing the microscope 12 and the flank surface 16 facing sideways. A background panel 18 having a color selected to provide image contrast is positioned at one side of the tool 10 opposite the microscope 12. Fiber optic emitters 20 and 22 are positioned to direct high intensity light onto the crater area of the tool from two different directions. The emitters 20 and 22 are positioned at shallow angles A and B with respect to the surface. Angles A and B on the order of 15 to 30 degrees have proven to be suitable, although 15 to 20 degrees, is usually preferred. A third fiber optic emitter 24 is directed downwardly to illuminate the background panel 18. The light is supplied to the emitters 20-24 by the fiber optic illuminator 26 shown in FIG. 3. The light intensity of the emitters is individually adjustable to allow the contrast to be optimized.

In use, the lighting is adjusted to obtain contrast between the wear region and the base metal, or unworn region of the tool face. In addition, contrast is obtained between the tool and the background 18. The background may appear to be darker or lighter than the tool. Similarly, the wear region may be darker or lighter than the base. This is determined by the selection of lighting angles and intensities.

Referring again to FIG. 3, a solid state CCD camera 27 with 488×380 pixel resolution is mounted on the microscope 12 which is set for a magnification of ×12. The camera 27 produces video signals in the standard RS-170 format. A Hotronics time base corrector 28 is connected to the video output of the camera to eliminate synchronization problems on the image analysis system 30. A suitable high performance image processing system for this application is made by Vicom Systems, Inc., San Jose, Calif. and is based on a Motorola 68000 microprocessor and Versabus. The system memory includes four high resolution image planes (512×512×16) and a vision array processor is used for real time image processing as well as general purpose computations. The tool wear analysis software is written in PASCAL and uses various VICOM image processing commands. Each processing step can be displayed on a color monitor 32, and the measurement results are sent to a mainframe computer for further analysis. A terminal 34 is used for operator input.

Figure 5:
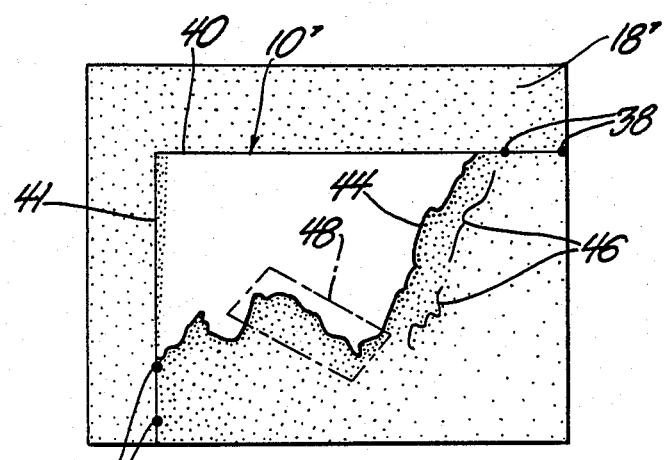
FIGS. 5 and 6 are views of images developed by machine vision of the flank face and rake face respectively as generated at an intermediate step in the method of the invention.
Figure 6:
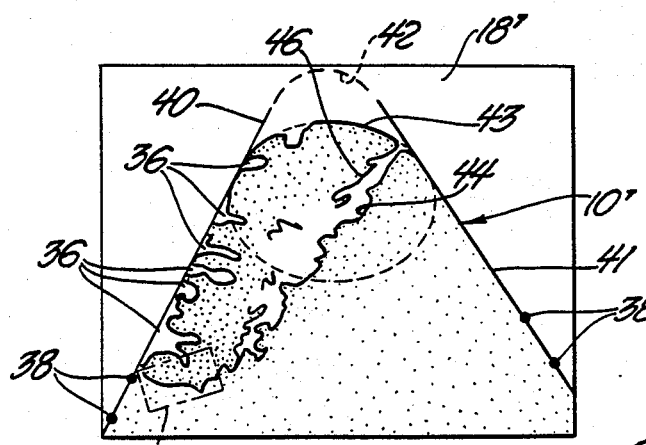

Tool image acquisition and preprocessing is accomplished by reading 16 images of a single point cutting tool which are digitized and averaged to reduce the camera and digitizer electronic noise. Then, a simple contrast stretching operation is performed to enhance the image. The image at this point in the process has fairly sharp outer boundaries except where the tool edge is chipped. Such images are shown in FIGS. 5 and 6 for the flank face and the rake face respectively, except that the images lack the lines 40-48 which are added later. In FIG. 5 the gray background 18' shows the panel 18 surrounding a corner of the tool image 10'. The light area in the corner of the tool image is the wear area corresponding to $A_2$ of FIG. 1. The darker area on the tool image is mottled in places. In FIG. 6 the background 18' is shown as lighter than the tool image 10'. In this case the crater wear region corresponding to $A_4$ of FIG. 2 is shaded much like the unworn face but some boundaries are evident. Light areas 36 on the nose and on the left side of the tool image reveal chipped edges and make the tool edge less definite in appearance. The wear region may have the appearance of a partly cloudy sky with some of the "cloud" edges representing the wear boundary and other edges presenting misleading information. Generally, human vision can discern the true boundaries and thus an operator's judgement interacting with machine vision capabilities is used to segment the image into base and wear regions.

Interactive segmentation follows image acquisition and has two phases. The first phase is to extract the edges of a new tool profile by extrapolating a portion of the remaining edges of the worn tool. Interactive thresholding is performed on the image using operator selection of threshold level. This operation continues to better define the outer tool edges until the operator is satisfied with the result. Then two edge points 38 on each unworn edge are selected to define the edges 40 and 41 for the new (unworn) tool profile. The edges or boundary lines 40 and 41 are extrapolated by the program and superimposed on the image. The edge 40 in each case is the edge in primary contact with the workpiece. Using these new tool boundary lines 40 and 41, the software computes the nose angle of the tool to identify which view is being analyzed. If the angle is less than 80 degrees, the program identifies that the rake face (crater wear) image is being processed and a circular arc 42 is drawn by the analyzer 30 to designate the new tool nose radius according to the tool manufacturer's specification stored in the analyzer 30. By an interactive process a circle 43 is drawn along the worn nose to define the present boundary and form a basis for calculation of nose wear depicted as area $A_3$ in FIG. 2. The circle appears to be an ellipse due to system induced distortion, as discussed below. In FIG. 5 the new tool boundary 41 for the left side is outside the light wear area thus showing that the side has been eroded.

During the second phase of the operation, the wear area is segmented interactively. This area generally has different intensities due to irregularities in wear surface texture, causing variations in reflection. As a result, a simple thresholding operation for the entire wear area is impossible and local thresholding is used, edges being identified where the light intensity gradient of neighboring pixels reaches a threshold value. This results in edges displayed over the image which include true boundaries 44 as well as spurious edges 46. In addition the boundaries of the chipped areas 36 are shown. Operator interaction is needed to sort out the true boundaries. A windowing technique is used to connect the edges that define the boundary 44 of the wear area. The operator uses the cursor to select window size and placement on edge portions of interest. Rectangular windows 48 are generated using a cursor and the program selects boundary segments lying only in the windows. Several windows are used, one at a time, along the boundary line 44. An accept command stores the edge in the image plane for later computation. This interactive procedure continues until all edges are selected. The results of each operation can be displayed using various colors on the graphics monitor. To obtain information about chipped edges, the boundaries of the chipped areas 36 are determined interactively and displayed in a different color. During the operation, important variables such as new tool boundary line equations, and coordinates of each window are stored in a data file.

Figure 7:
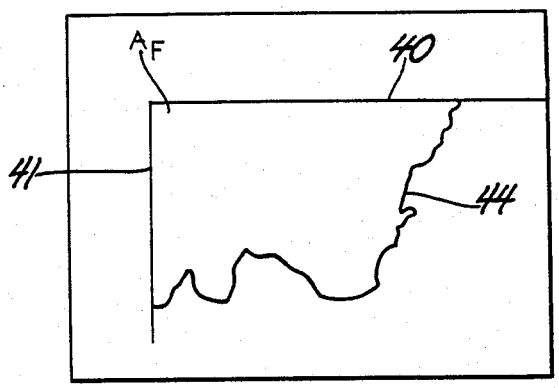
FIGS. 7 and 8 are views of images developed by machine vision of the flank face and rake face respectively showing the boundary lines and the wear regions of the tool according to the method of the invention.
Figure 8:
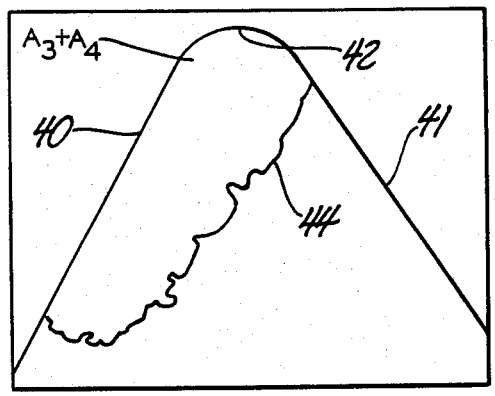

Using the wear edge image, a region of interest for the wear area is defined. Edge smoothing using a morphological operation is employed to eliminate spurious edges or holes. Then the coordinates of boundary points are obtained. The resulting boundary is shown in FIGS. 7 and 8. The wear area is computed by adding the number of pixels in the line pieces defined by the boundary points. The row coordinates of the points are sorted in ascending order to group the horizontal line pieces.

To compute the contact length between the cutting tool and workpiece, the wear region is rotated with respect to the image plane origin using the slope of the new tool boundary line 40. This locates the boundary line along the axis such that the height of the region is the contact length of the tool. The maximum width of the wear region is also derived from the width of the rotated image. The average width of the wear region is computed from the ratio of the area to the contact length. Results are displayed using the color graphics.

After the computations are completed, data on the tool wear parameters are stored in an output file. The data include the wear area, number of edge points, slope of the new tool boundary line, extreme projection points on the new tool edge, and the heights and widths of each wear region. Specific wear data such as the eroded area measured from the flank view of a chipped tool, or the average nose radius of a worn tool as measured from the rake view are also stored. The following tables show typical data derived from the measurements. This data was obtained for repeatability tests and show that very small variations result from the procedure.

TABLE 1

Flank Wear Parameter Measurement - Repeatability Test

| Wear Parameter | Unit | Measurements #1 | #2 | % Variation |
|---|---|---|---|---|
| Wear Area ($A_F$) | mm$^2$ | 2.430 | 2.340 | −3.70 |
| Chipped Area ($A_2$) | mm$^2$ | 0.390 | 0.381 | −2.30 |
| Average Flank Wear ($W_{avF}$) | mm | 1.107 | 1.061 | −4.16 |
| Maximum Flank Wear ($W_{Fmax}$) | mm | 1.916 | 1.936 | 1.01 |
| Chip-Contact Length ($L_F$) | mm | 2.207 | 2.195 | −0.54 |

TABLE 2

Crater Wear Parameter Measurement - Repeatability Test

| Wear Parameter | Unit | Measurements #1 | #2 | % Variation |
|---|---|---|---|---|
| Wear Area ($A_C$) | mm$^2$ | 1.153 | 1.128 | −2.17 |
| Chipped Area ($A_3$) | mm$^2$ | 0.186 | 0.174 | −6.45 |
| Average Width of Crater ($W_{avC}$) | mm | 0.988 | 1.065 | 7.79 |
| Length of Crater ($L_C$) | mm | 1.660 | 1.680 | 1.20 |
| Average Nose Radius ($R_{av}$) | mm | 1.250 | 1.250 | 0.00 |

Since the image processing software computed the wear lengths and areas in terms of pixel counts, it is necessary to determine the proper calibration factors (mm/pixel) to compute the absolute value of the wear parameters. Due to the aspect ratio of the camera and the image digitization rate of the VICOM system, the pixels are displayed such that each pixel is stretched more in the horizontal direction than in the vertical direction. As a result, one pixel distance in the horizontal direction represents a larger length than in the vertical direction.

To measure the correct calibration factors, a set of parallel lines (with known distances between two lines) is focused under the microscope. Two images are digitized, one with the lines running vertically and the other with the lines running horizontally. The pixel distances between 10 of those lines are measured for each set of lines. For the data shown in the tables, the following calibration factors were calculated:

A = 0.0124 mm/pixel (in the horizontal direction)
B = 0.0103 mm/pixel (in the vertical direction)

In the event that the measurement setup dictates that the microscope not be normal to the tool surface being inspected, the calibration must take the angle into account.

To evaluate the invention in the light of conventional measurements The tool wear tests results obtained from the image processing measurement were compared with the toolmaker's microscope measurements. It may be noted that the toolmaker's microscope could only measure the length and maximum width of each wear region. The results revealed that the toolmaker's microscope measurements typically provided sightly smaller measurement values than the image processing technique. This is due to the fact that the image processing technique always computed the wear dimensions using the new tool edge as an absolute reference. On the other hand, toolmaker's microscope measurements only provide the distance between the edges of a worn tool surface and does not include the dimensional changes due to erosion from a new tool surface. Moreover, the image processing technique can provide an absolute measure of the irregular tool wear area which is the most critical parameter for tool wear studies. Specific data such as tool chipped area and change in tool nose radius also provide valuable information for tool wear characterization and could not be obtained using a toolmaker's microscope.

The system allows accurate location of tools using a fixture. Thus, as an alternate to the procedure described above for determining the new tool boundary, the boundary of a new tool can be stored and superimposed on a worn tool image for absolute measurements of wear parameters. Similarly, the digital storage of the tool wear images makes it possible to make successive comparisons of wear regions of a given tool at different stages in its life. Although the tool wear measurement technique is designed as a laboratory method, it is feasible to mount the image acquisition equipment on a machine tool for making tool wear measurements between machine cycles without removing the tool from its holder.

It will thus be seen that the method of tool wear measurement provides improved accuracy of measurement and offers better, more useful parameters for quantizing tool wear. Further details of the method are disclosed in the following publication which is incorporated by reference: Y. H. Lee et al, "Cutting Tool Wear Measurement Using Computer Vision," SME Technical Paper, No. MR86-934, 1986.

The embodiments of the invention in which an exclusive property or privilege is claimed as defined as follows:

1. The method of measuring the wear of a cutting tool comprising the steps of;
   illuminating a worn cutting tool face by directing light toward the face at an angle which shows contrast between worn and unworn surface regions,
   acquiring and storing a digital image of the cutting tool face in the form of an array of gray scale pixel values,
   segmenting wear regions of the image of the basis of the contrast, the segmenting process including
   (a) extracting the edges of a new tool profile by extrapolating from the unworn edges of the worn tool, and (b) extracting the wear edges by thresholding operations, whereby the wear region is defined by the new tool profile edges and the wear edges, and measuring the dimensions of the segmented wear regions by determining the coordinates of boundary points of the image lines in the wear region, and computing the wear area by adding the number of pixels in the lines defined by the boundary points.

2. The method of measuring the wear of a cutting tool comprising the steps of;

illuminating a worn cutting tool face by directing light toward the face at an angle which shows contrast between worn and unworn surface regions, interactively acquiring and storing a digital image of the cutting tool face in the form of an array of gray scale pixel values, segmenting wear regions of the image on the basis of the contrast, the segmenting process including (a) extracting the edges of a new tool profile by identifying unworn edges by operator input and extrapolating from the edges by machine and determining all apparent edges in the image by machine and selecting desired edges by operator input (b) extracting the wear edges by determining all apparent edges in the image by machine and selecting desired edges by operator input and measuring the dimensions of the segmented wear regions.

* * * * *